United States Patent [19]

Iwama et al.

[11] 4,414,157

[45] Nov. 8, 1983

[54] PROCESS FOR THE PURIFICATION OF CRUDE GLYCERIDE OIL COMPOSITIONS

[75] Inventors: Akio Iwama; Yoshitaka Kazuse, both of Osaka, Japan

[73] Assignee: Nitto Electric Industrial Co., Ltd., Osaka, Japan

[21] Appl. No.: 335,493

[22] Filed: Dec. 30, 1981

[30] Foreign Application Priority Data

Dec. 30, 1980 [JP] Japan .............................. 55-186985

[51] Int. Cl.$^3$ ............................ C09F 5/10; C11B 3/00
[52] U.S. Cl. ................................ 260/428.5; 260/403; 260/412.5; 260/428
[58] Field of Search .................... 260/403, 412.5, 428, 260/428.5

[56] References Cited

U.S. PATENT DOCUMENTS

| | | | |
|---|---|---|---|
| 3,847,804 | 11/1974 | Pico | 260/412.5 |
| 4,062,882 | 12/1977 | Gupta | 260/428.5 |
| 4,093,540 | 6/1978 | Gupta | 260/428.5 |
| 4,240,914 | 12/1980 | Iwama et al. | 521/27 X |

*Primary Examiner*—Helen M. S. Sneed
*Attorney, Agent, or Firm*—Sughrue, Mion, Zinn, Macpeak and Seas

[57] ABSTRACT

A process for the purification of crude glyceride oil compositions which comprises bringing a miscella of a crude glyceride oil composition containing therein a glyceride oil and phospholipid into contact with a capillary semipermeable membrane to concentrate the miscella to a predetermined level, and thereafter bringing the preliminarily concentrated miscella into contact with a tubular semipermeable membrane to concentrate the miscella to a higher level.

12 Claims, 2 Drawing Figures

PROCESS FOR THE PURIFICATION OF CRUDE GLYCERIDE OIL COMPOSITIONS

FIELD OF THE INVENTION

The present invention relates to a process for the purification of crude glyceride oil compositions using an internal pressure type module of semipermeable membrane.

BACKGROUND OF THE INVENTION

Vegetable oils usually used as food oils include soybean oil, rapeseed oil, coconut oil, sesame oil and the like. In producing such plant oils, depending on the amount of oil contained therein, a raw material is pressed or the feed material is extracted with an organic solvent (such as hexane) to obtain miscella, and, then, the organic solvent in the miscella is distilled away to yield a crude glyceride oil composition. Such a crude glyceride oil composition generally contains phospholipid, saccharide organic fatty acid, amino acid, protein, dye material and the like as unavoidable impurities. Of these impurities, phospholipid must absolutely be removed for the reasons described below. The crude glyceride oil composition usually contains 0.5 to 3 wt% of gum material composed mainly of phospholipids, such as lecithin, which gum material is decomposed on heating the oil to result in oil coloration, the generation of unpleasant odors and a deterioration in the taste of the oil. It is necessary, therefore, to remove such gum material from the crude glyceride oil composition as much as is possible.

In accordance with conventional purification methods, water is added to the crude glyceride oil composition to hydrate the gum material and after the same is coalesced, the gum material is removed by centrifugal separation. The thus-purified glyceride oil composition will still contain about 0.2 to 0.4 wt% of gum material. Usually, therefore, gum removal is repeated using chemicals, followed by treatment to remove color, acids and odors to obtain a glyceride oil product having a gum content of 100 ppm or less. Thus, conventional purification methods suffer from the disadvantages in that they involved repeated complicated gum removal operations and a considerable amount of oil is inevitably lost during such operations.

In order to overcome the disadvantages of such conventional purification methods, a process for the purification of crude glyceride oil compositions was proposed in U.S. Pat. No. 4,062,882. In accordance with this process, a crude glyceride oil composition is diluted with an organic solvent (such as hexane) to prepare miscella, the thus-prepared miscella is brought into contact with a synthetic polymeric semipermeable membrane under pressure to separate it into a membrane permeable solution composed of hexane and glyceride oil and a concentrated membrane impermeable material, whereafter the hexane is distilled from the membrane permeable solution to obtain a purified oil. As the concentrated membrane impermeable material contains high concentrations of phospholipids, such as lecithin, they may be recovered therefrom.

Various problems, however, arise in the production of purified glyceride oil on a commercial scale by membrane treatment of crude glyceride oil compositions per the above proposed process.

In order to obtain a purified glyceride oil as a membrane permeable solution at a high recovery rate via membrane treatment of miscella, it is usually necessary to concentrate the miscella to about 50 to 60 times original concentration. The viscosity of the miscella increases as it is concentrated, and depending on the form in which the semipermeable membrane is used, it is impossible to concentrate the miscella to such high levels. For example, internal pressure type capillary semipermeable membranes having a small pipe cross-sectional area, e.g., an inner diameter of about 0.1 to 2 mm, are advantageous for miniaturization of equipment since they have a high membrane area per unit volume. With such semipermeable membranes, however, it is possible to concentrate only to about 10 times the original concentration, and the miscella still has a relatively low viscosity.

The amount of membrane permeable solution per unit membrane area is highly influenced by the pressure applied when the miscella is brought into contact with the membrane. In the case of internal pressure type capillary semipermeable membranes, however, it is generally impossible to reinforce them with an unwoven fabric tube, etc., and furthermore, the membrane walls are relatively thin, in distinction to hollow filament membranes. Since the pressure of the supplied miscella must be supported by such thin membranes without reinforcement, the maximum pressure that can be applied is only about 5 kg/cm$^2$. Therefore, when the viscosity of the miscella is increased, it is not possible to increase the amount of the membrane permeable solution by raising the pressure at which the miscella is supplied. Thus, purification of crude glyceride oil compositions by a one stage membrane treatment using capillary semipermeable membranes requires a long period of time and can be performed on a commercial scale only with difficulty.

On the other hand, the use of internal pressure type tubular semipermeable membranes having an inner diameter of, e.g., about 2 to 20 mm, permits one to concentrate the miscella about 50 to 100 times original concentration since they have a large tube cross-sectional area. Furthermore, since such tubular membranes are generally reinforced with a paper tube, an unwoven fabric tube, a porous polymer tube, a porous metallic tube or the like, it is possible to apply a pressure as high as about 80 kg/cm$^2$ which permits one to increase the amount of membrane permeable solution even with miscella having a high viscosity. However, the purification of crude glyceride oil compositions by a one stage membrane treatment using tubular semipermeable membranes requires large size equipment and the number of necessary membrane modules is markedly increased, which is undesirable from an economic viewpoint. Thus, the use of semipermeable membranes in a form which enables one to treat miscella having high viscosity significantly increases equipment size, is accompanied by an increase in purification costs and thus one loses many of the advantages of membrane treatment.

As a result of research regarding the above-described problems encountered in the purification of crude glyceride oil compositions with internal pressure type membrane modules, it has been found that by firstly treating the miscella of a crude glyceride oil composition with a capillary semipermeable membrane and then treating the thus-concentrated miscella with a tubular semipermeable membrane, the miscella can be highly concentrated and a purified glyceride oil can be obtained at a high recovery rate while minimizing the number of membrane modules necessary.

SUMMARY OF THE INVENTION

The present invention relates to a process for the purification of crude glyceride oil compositions comprising diluting a crude glyceride oil composition containing a glyceride oil and phospholipid(s) with an organic solvent, bringing the diluted crude glyceride oil composition under pressure into contact with an internal pressure type capillary semipermeable membrane having an inner diameter of 0.1 to 2 mm to separate it into a semipermeable membrane permeable liquid and a semipermeable membrane impermeable liquid, bringing the thus-concentrated semipermeable membrane impermeable liquid under pressure into contact with an internal pressure type tubular semipermeable membrane having an inner diameter which is greater than (from the practical viewpoint, about 5 to 160 times greater than) that of the above capillary semipermeable membrane and which is 20 mm or less to separate it into a semipermeable membrane permeable liquid and a semipermeable membrane impermeable liquid, and removing the organic solvent from at least one of the total semipermeable membrane permeable liquid obtained by the capillary and tubular membrane treatments and the semipermeable membrane impermeable liquid to obtain a purified glyceride oil and/or a purified phospholipid.

DETAILED DESCRIPTION OF THE INVENTION

Figure 1:
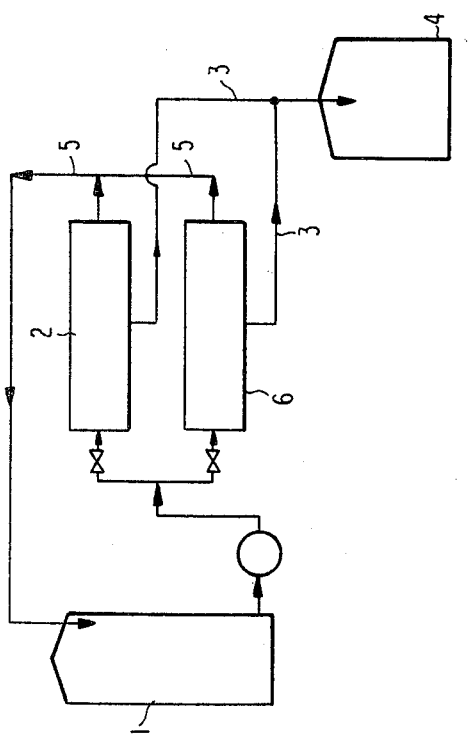
FIG. 1 is a flow diagram of one embodiment of the process of the invention.

The terminologies "internal pressure type capillary semipermeable membrane" and "internal pressure type tubular semipermeable membrane" used herein intend to mean an internal pressure type module of capillary semipermeable membrane(s) and an internal pressure type module of semipermeable membrane(s), respectively. One skilled in the art can easily understand the intended embodiment by these terminologies.

The inner diameter of the internal pressure type capillary semipermeable membrane as used herein is usually 0.1 to 2 mm, preferably 0.5 to 1.8 mm. The thickness of the membrane wall is usually 0.05 to 0.8 mm, preferably 0.1 to 0.5 mm.

In accordance with the process of the invention, a solution of a crude glyceride oil composition in an organic solvent, i.e., miscella, is introduced under pressure into a membrane module with an internal pressure type capillary semipermeable membrane where the miscella is concentrated to 2 to 10 times, preferably 3 to 5 times, the original concentration. When the inner diameter of the capillary semipermeable membrane is too small, it is difficult to concentrate the miscella to within the above range. On the other hand, when the inner diameter is too large, although the miscella can be concentrated to whthin the above range, the membrane area per unit volume of the equipment is decreased which undesirably leads to an increase in equipment size.

The capillary semipermeable membranes are disposed in parallel to one another in the module. The miscella is treated under conditions such that the average linear rate at which the miscella is supplied in the lengthwise direction is 0.1 to 5 m/sec, preferably 0.5 to 2 m/sec, and the pressure at which the miscella is supplied is 0.2 to 5 kg/cm$^2$ (gauge pressure; hereinafter, all are the same), preferably 0.5 to 3 kg/cm$^2$. Under these conditions, the miscella can be concentrated to within the above-described range at a high permeable liquid amount by the use of an internal pressure type capillary semipermeable membrane. When the linear rate at which the miscella is supplied is too low, concentration polarization undesirably occurs. On the other hand, when the linear rate is too large, it is necessary to apply a high pressure which undesirably leads to the danger of membrane breakdown and to an excessive increase in pressure drop.

In the first membrane treatment of the process of the invention, the miscella is concentrated to at most about 10 times the original concentration. The viscosity of the miscella which is concentrated to about 10 times the original concentration is usually about 0.5 to 5 centipoises (cps), although it varies depending on the glyceride oil content of the original miscella. Therefore, the miscella can be treated by the use of an internal pressure type capillary semipermeable module while maintaining the amount of permeable liquid at a high level.

The thus-preliminarily concentrated miscella is further concentrated by a second membrane treatment using an internal pressure type tubular semipermeable membrane. The inner diameter of the tubular semipermeable membrane is chosen so that it is 20 mm or less but is greater in diameter than the inner diameter of the capillary semipermeable membrane used in the first membrane treatment, taking into account the concentration ratio and viscosity of the concentrated miscella obtained by the first membrane treatment. Thus, the inner diameter of the tubular semipermeable membrane is usually 2 to 20 mm, preferably 3 to 17 mm, and particularly preferably 5 to 15 mm.

In the second membrane treatment, the miscella is concentrated to 3 to 60 times, preferably 5 to 60 times, and particularly preferably 50 to 60 times the original concentration (the original starting miscella). Therefore, it is not acceptable to use a tubular membrane having a too small an inner diameter. On the other hand, the use of a tubular membrane having a too large an inner diameter undesirably leads to a reduction in membrane area per unit volume of the equipment as in the case of the capillary membrane described above.

Since the tubular semipermeable membrane has a large tube cross-sectional area, the miscella which now has a high viscosity due to its high concentration can be efficiently treated, and, furthermore, can be treated at a large permeable liquid amount (e.g., 5–60 l/m$^2$.hr) by supplying it at high pressure (e.g., 3–7 kg/cm$^2$). The miscella is treated under conditions such that the average linear rate at which the miscella is supplied in the lengthwise direction of the tube is 0.5 to 10 m/sec, preferably 1 to 5 m/sec, and the pressure at which the miscella is supplied is usually about 1 to 10 kg/cm$^2$, although pressure is not overly critical.

In the process of the invention, as described above, the micella is preliminarily concentrated to at most about 10 times the original concentration by the use of the internal pressure type capillary semipermeable membrane having a high membrane area per unit volume, and thereafter is further concentrated by the use of an internal pressure type tubular semipermeable membrane. This permits a reduction in equipment size and treatment of the miscella at high permeable liquid amounts, i.e., in a short period of time. Thus, the process of the invention is suitable for the purification of crude glyceride oil compositions on a commercial scale.

Figure 2:
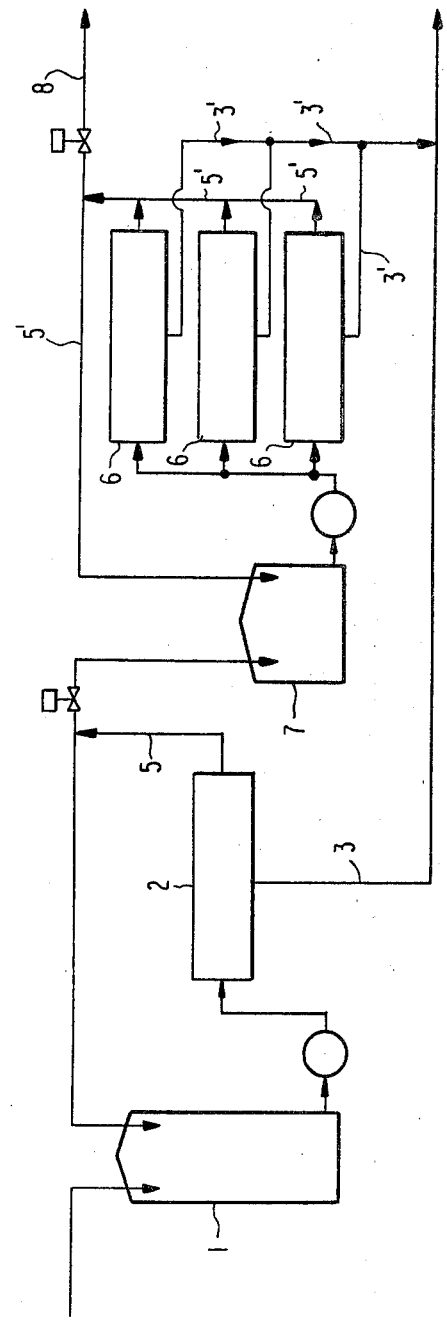
FIG. 2 is a flow diagram of another embodiment of the process of the invention.

Hereinafter, the invention will be explained in detail with reference to the accompanying drawings wherein FIGS. 1 and 2 are flow diagrams of embodiments of the process of this invention.

Referring to FIG. 1, a miscella is introduced from a storage tank 1 into capillary semipermeable membrane module 2 where it is separated into a membrane permeable liquid 3 and a membrane impermeable liquid 5. The membrane permeable liquid 3 is transferred to permeable liquid tank 4 and the membrane impermeable liquid 5 is returned to storage tank 1. When the concentration of the miscella reaches a predetermined level, the flow path of the miscella is changed by an appropriate valving, that is, the preliminarily concentrated miscella is introduced into a tubular membrane module where it is further concentrated. The resultant membrane permeable liquid is sent to membrane permeable liquid tank 4.

In accordance with another embodiment of the process of the invention as shown in FIG. 2, a miscella is continuously treated. Specifically, a miscella is continuously supplied to storage tank 1 and miscella is continuously introduced from storage tank 1 into capillary semipermeable membrane module 2 where it is separated into a membrane permeable liquid 3 and a membrane impermeable liquid 5. The membrane impermeable liquid 5 is introduced via a storage tank 7 into tubular semipermeable module 6 where it is separated again into a membrane permeable liquid 3' and a membrane impermeable liquid 5'. In order to maintain steady state conditions, a part of the membrane impermeable liquid 5' is withdrawn as a concentrated liquid 8. If necessary, the membrane impermeable liquid 5 separated in the capillary semipermeable membrane module 2 may be returned to the storage tank 1 and recycled.

The semipermeable membrane used herein is preferably made of a polyimide or a polyamide. In particular, a semipermeable membrane comprising a polyimide consisting essentially of a repeating unit represented by the general formula:

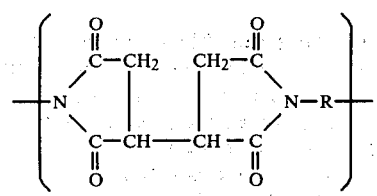

(wherein R is a divalent organic group), and a semipermeable membrane comprising an aromatic polyamide consisting essentially of a repeating unit represented by the general formula:

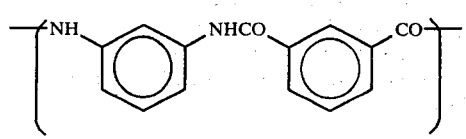

are preferred.

Semipermeable membranes comprising the above polyimide (1) are already known; a method of producing the same is described in detail in U.S. Pat. No. 4,240,914, Japanese Patent Application (OPI) No. 152507/1980 (the term "OPI" as used herein refers to a "published unexamined Japanese patent application"), etc.

In this invention, a semipermeable membrane comprising a polyimide consisting essentially of a repeating unit represented by general formula (1) wherein R is:

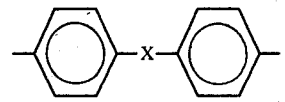

(wherein X is a divalent bonding group) is preferably used. Examples of X include $-CH_2-$, $-C(CH_3)_2-$, $-O-$, and $-SO_2-$. In particular, polyimides where X is $-CH_2-$ or $-O-$, which have a constant molecular weight cut-off over a long period of time even when in contact with crude glyceride oil compositions heated to high temperatures are preferred.

Semipermeable membranes comprising the above-described aromatic polyamides (2) are disclosed in, for example, Japanese Patent Publication Nos. 43540/1978 and 77843/1979.

The semipermeable membrane used herein usually has a molecular weight cut-off of 10,000 to 100,000, preferably 10,000 to 50,000. A semipermeable membrane called an ultrafilter is preferably used in the invention. When the molecular weight cut-off value is too small, the amount of the permeable liquid tends to be decreased. On the other hand, when this value is too high the gum material separating ability tends to be poor.

The molecular weight cut-off can be determined by measuring the ratio of a solute having a known molecular weight removed by the semipermeable membrane, i.e., by measuring the rejection of the semipermeable membrane. Practically, it is preferred that the rejection of the semipermeable membrane be measured using a toluene solution of polyethylene glycol (solute; concentration: 5,000 ppm) having a known average molecular weight and a monodisperse molecular weight distribution. In the invention, therefore, the rejection of the semipermeable membrane is measured using toluene solutions of polyethylene glycols having different average molecular weights at: a temperature of 25° C. and a pressure of 3 kg/cm$^2$; the minimum molecular weight of a polyethylene glycol having a rejection of at least 95% is determined to be the molecular weight cut-off of the membrane.

Lecithin, which is a typical component of phospholipids, has a molecular weight nearly equal to that of triglyceride. At the membrane treatment conditions of the invention, however, several ten to several hundred lecithin molecules associate together to form miscella. Therefore, by bringing crude glyceride oil compositions into contact with a semipermeable membrane having a molecular weight cut-off falling within the above-described range (10,000 to 100,000, preferably 10,000 to 50,000), phospholipid is almost completely removed by the membrane, whereby a purified glyceride oil can be obtained.

In order to accelerate miscelle formation of phospholipid while at the same time diluting the crude glyceride oil composition in the process of the invention, organic solvents are used. These organic solvents must not dissolve the membrane. The molecular weight thereof is preferably smaller than that of the glyceride oil and is usually 50 to 200, preferably 60 to 150.

Examples of suitable organic solvents which can be used include aliphatic hydrocarbons such as hexane, heptane, and octane, alicyclic hydrocarbons such as cyclopropane, cyclopentane, cyclohexane, and cycloheptane, aromatic hydrocarbons, such as benzene, toluene, and xylene, aliphatic ketones such as acetone and methyl ethyl ketone and lower aliphatic acid esters such as ethyl acetate and butyl acetate. These organic solvents can be used alone or in combination with each other. Of the above-described organic solvents, aliphatic hydrocarbons such as hexane are preferred.

The miscella prepared by diluting the crude glyceride oil composition with the organic solvent usually contains 10 to 80% by weight, preferably 20 to 50% by weight, of glyceride oil although it is not limited thereto.

Depending on the type of raw material such as soybean or rapeseed oil, the crude glyceride oil composition can be extracted, as described hereinbefore, directly from the feed material with the organic solvent. In the process of the invention, the thus-extracted liquid may be subjected to the membrane treatment as such. Thus, the term "extraction" is construed herein to be the same as the dilution with the organic solvent. In addition, gum-removed oil obtained by distilling away the solvent after the solvent extraction by a conventional purification method can be used as the crude glyceride oil composition of the invention, and, of course, a crude material obtained by pressing a raw material can be used as the crude glyceride oil composition. Furthermore, if desired, a gum material-containing glyceride oil obtained at any desired stage of a conventional purification method can be used as the crude glyceride oil composition.

The term "miscella" is used herein to refer to an organic solvent solution of the above-described crude glyceride oil composition prepared by the above-described technique.

The miscella of the crude glyceride oil composition, i.e., the solution of the crude glyceride oil composition in the organic solvent, is brought under pressure into contact with the capillary and tubular semipermeable membranes at a temperature at which evaporation of the organic solvent is not significant, is usually from 5° C. to 100° C., and preferably from 10° C. to 60° C. In general, by raising the treatment temperature the amount of the permeable liquid processed can be increased. In the case of a semipermeable membrane made of the above-described polyimide (1), even if membrane treatment is performed at much higher temperatures, the semipermeable membrane maintains its molecular weight cut-off at a substantially constant level, and thus the membrane permeable liquid contains substantially no phospholipid. At temperatures lower than 5° C., however, the amount of permeable liquid is too small from a practical viewpoint, whereas at temperatures higher than 150° C. there is the danger that the gum material composed mainly of phospholipid will be heat decomposed and cannot be efficiently removed by the membrane.

The process of the invention is suitable for the purification of crude plant glyceride oil compositions containing a high amount (e.g., 0.5–3.0 wt%) of phospholipid, e.g., lecithin. In addition, the process of the invention can be used for the purification of crude animal glyceride oil compositions such as fish oil, liver oil, whale oil, mutton tallow or the like which contains cephalin as phospholipid. Furthermore, as lecithin, etc., are useful and valuable materials, if desired or necessary they can be recovered from the membrane impermeable liquid. For example, by again diluting the membrane impermeable liquid with the organic solvent, e.g., hexane, subjecting the resulting miscella to the described two-step membrane treatment and then removing the organic solvent from the membrane impermeable liquid, high purity phospholipid can be obtained.

In accordance with the process of the invention as hereinbefore described, the miscella is concentrated by the use of the capillary semipermeable membrane having a large membrane area per unit volume while it still has low viscosity and, when the viscosity of the miscella is increased (generally, 1–1,000 cps, preferably 1–100 cps), the miscella is further concentrated to a higher concentration level by the use of a tubular semipermeable membrane. Thus, equipment size can be reduced and a high amount of miscella can be treated in a short period of time.

The life of the capillary semipermeable membrane and the tubular semipermeable membrane is generally from about 6 months to about 1 year.

Further, an external pressure type module of capillary membranes may be used instead of the inner pressure type module of capillary membranes, though such is not advantageous as compared to the inner pressure type module.

The following examples are given to illustrate the invention in greater detail although the invention is not limited thereto.

EXAMPLE 1

Fourteen hundred capillary ultrafiltration membranes having an inner diameter of 1.5 mm, a tube wall thickness of 0.4 mm and a molecular weight cut-off of 50,000, which were made of aromatic polyamide (2) as hereinbefore described, were disposed in parallel in a metallic cylinder having an outer diameter of 107 mm to produce a capillary type membrane module having a membrane length of 770 mm and an effective membrane area of 5.0 m².

Eighteen tubular permeable membranes having an inner diameter of 12 mm were connected with each other in series and placed in a metallic cylinder having an outer diameter of 107 mm to produce a tubular membrane module having a membrane length of 770 mm and an effective membrane area of 0.48 m².

The thus-produced membrane modules were arranged as shown in FIG. 1 to provide a membrane treatment apparatus.

Six hundred liters of soybean oil miscella composed of 30 parts by weight of a crude soybean oil composition containing 1.83% by weight of phospholipid based on the crude soybean oil composition weight and 70 parts by weight of hexane (soybean oil content of the miscella: 29.5% by weight; the phospholipid content: 0.55% by weight) was treated at the conditions shown in Table 1.

Experiment (1)

The miscella was recycled and introduced only into the capillary type membrane module by appropriate valving. When the amount of the membrane permeable liquid reached 515 liters, no more membrane permeable liquid could be obtained.

Experiment (2)

The miscella was recycled and introduced only into the tubular membrane module by appropriate valving.

Experiment (3)

The miscella was firstly recycled and introduced into the capillary type membrane module where it was concentrated to about 4 times its original concentration in 120 minutes. Then, the thus-preliminarily concentrated miscella was recycled and introduced into the tubular membrane module where it was concentrated to 30 times the original concentration in 292 minutes. From the capillary type membrane module, 450 liters of membrane permeable liquid was obtained, and from the tubular membrane module, 130 liters of membrane permeable liquid was obtained. Thus, the total amount of membrane permeable liquid obtained was 580 liters.

The results are shown in Table 1.

As can be seen from the results, the miscella cannot be concentrated to a high level by one stage treatment using the capillary type membrane module alone while when the tubular membrane module alone is used, the miscella can be concentrated to a high level, but such takes a markedly long period of time. The process of the invention enables greatly shortened treatment times.

EXAMPLE 2

Experiment (4)

In the same manner as in Example 1 except that a membrane having a molecular weight cut-off of 20,000, which was made of the above-described polyimide (1) wherein R is:

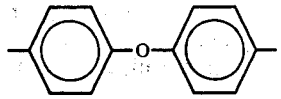

was used as the ultrafiltration membrane, capillary type membrane and tubular membrane modules having the same dimensions as those in Example 1 were produced. These modules were arranged as shown in FIG. 2 to produce an apparatus comprising one capillary type membrane module and three tubular membrane modules connected in series.

Three hundred liters per hour (l/hr) of a miscella composed of 30 parts by weight of a crude soybean oil composition containing therein 1.76% by weight of phospholipid based on the weight of the crude soybean oil composition and 70 parts by weight of hexane (soybean oil content of the miscella: 29.4% by weight; phospholipid content: 0.53% by weight) was continuously introduced into a storage tank. At steady state, the concentration factor was 30 times, and 291 l/hr of each of membrane permeable liquids 3 and 3' and 9 l/hr of a concentrated liquid were obtained via line 8 in FIG. 2. The amount of the membrane permeable liquid from the capillary type module was 225 l/hr and the amount of the miscella introduced into the storage tank was 75 l/hr.

Experiment (5)

Using only one tubular membrane module, 26.5 l/hr of soybean miscella was recycled and supplied as shown in FIG. 1. At steady state, 25.6 l/hr of permeable liquid and 0.9 l/hr of concentrated liquid were obtained.

Therefore, in treating 300 l/hr of miscella with the tubular membrane module alone, it would be necessary to use 12 tubular membrane modules having the above-described dimensions.

The results are shown in Table 1.

In accordance with the process of the invention, the number of necessary modules can be reduced and the size of the apparatus can be reduced.

EXAMPLE 3

The concentrated miscella obtained in Experiment (4) was composed of 32 parts by weight of a soybean oil composition containing therein 39.8% by weight of phospholipid based on soybean oil composition weight and 68 parts by weight of hexane (phospholipid content of the concentrated miscella: 17.5% by weight; soybean oil content: 26.5% by weight).

In the same manner as in Example 1 except that a membrane having a molecular weight cut-off of 50,000, which was made of the above-described polyimide (1) (wherein R was

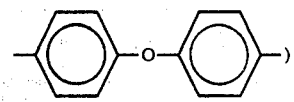

was used as the ultrafiltration membrane, capillary type membrane and tubular membrane modules having the same dimensions as those in Example 1 were prepared. The thus-produced membrane modules were arranged to produce an apparatus as shown in FIG. 1.

While maintaining the miscella at a composition of 3.5% by weight of phospholipid, 5.3% by weight of soybean oil, and 91.2% by weight of hexane (based on total miscella weight) by supplementing hexane continuously in an amount corresponding to that permeated through the membrane, the miscella was supplied to the membrane modules as per Experiments (6) to (8) below. The total amount of hexane supplemented during the membrane treatment was 320 kg.

Experiment (6)

The miscella was recycled and introduced into the capillary type membrane module alone by appropriate valving. When the amount of the membrane permeable liquid reached 300 kg, no more permeable liquid could be obtained.

Experiment (7)

The miscella was recycled and introduced into the tubular membrane module alone by appropriate valving.

Experiment (8)

The miscella was firstly introduced into the capillary type membrane module where it was concentrated to about 3 times in 95 minutes; thereafter, the thus-preliminarily concentrated miscella was recycled and introduced into the tubular membrane module where it was concentrated to about 20 times in 359 minutes to obtain a concentrated liquid. The amount of permeable liquid in the capillary type membrane module was 265 kg and the amount of the permeable liquid in the tubular membrane module was 115 kg.

The results are shown in Table 2.

TABLE 1

| Experiment | Initial Concentration of Soybean Oil in Miscella (wt %) | Membrane Treatment Conditions | | | | Permeable Liquid | | | | |
| --- | --- | --- | --- | --- | --- | --- | --- | --- | --- | --- |
| | | Flow Rate (l/min) | Pressure (kg/cm$^2$) | Temperature (°C.) | Treatment Time (min) | Amount (l) | Recovery Ratio (%) | Concentration of Soybean Oil (wt %) | Concentration of Phospholipid (ppm) | Rejection of Phospholipid (%) |
| (1) | 29.8 | 150(1.0)$^c$ | 0.8 | 40 | — | 515 | 85.8 | 29.0 | 221 | 98.8 |
| (2) | 29.7 | 14(2.1)$^c$ | 3.0 | 40 | 1,222 | 580 | 96.7 | 29.5 | 219 | 98.8 |
| (3) | 30.1 | a | a | 40 | 412 | 580 | 96.7 | 29.8 | 218 | 98.8 |
| (4) | 29.9 | b | b | 55 | — | 291 | 97.0 | 29.1 | 25 | 99.9 |
| (5) | 30.2 | 14 | 3.0 | 55 | — | 25.6 | 96.6 | 29.0 | 24 | 99.9 |

TABLE 2

| Experiment | Membrane Treatment Conditions | | | | Amount of Permeable Liquid (kg) | Amount of Concentrated Liqiud (kg) | Phospholipid Obtained by Removal of Hexane from Concentrated Liquid | |
| --- | --- | --- | --- | --- | --- | --- | --- | --- |
| | Flow Rate (l/min) | Pressure (kg/cm$^2$) | Temperature (°C.) | Treatment Time (min) | | | Phospholipid (wt %) | Soybean Oil (wt %) |
| (6) | 150 | 0.8 | 55 | — | 300 | 100 | 67.3 | 32.7 |
| (7) | 14 | 3.0 | 55 | 1,578 | 380 | 20 | 96.5 | 3.5 |
| (8) | a | a | 55 | 454 | 380 | 20 | 96.4 | 3.6 |

Note:
(a) The conditions in each module were the same as those under which each module was operated separately.
(b) The capillary type membrane module was operated under the following conditions: Flow rate of 150 l/min; pressure of 0.8 kg/cm$^2$; temperature of 55° C.; the tublar membrane module was operated under the same conditions as in Experiment (5).
(c) The figures in the parentheses indicate linear speed (m/sec).

While the invention has been described in detail and with reference to specific embodiments thereof, it will be apparent to one skilled in the art that various changes and modifications can be made therein without departing from the spirit and scope thereof.

What is claimed is:

1. A process for the purification of a crude glyceride oil composition which comprises diluting the crude glyceride oil composition containing a glyceride oil and phospholipid with an organic solvent, bringing the diluted crude glyceride oil composition under pressure into contact with an internal pressure capillary semipermeable membrane having an inner diameter of 0.1 to 2 mm to separate it into a semipermeable membrane permeable liquid and a semipermeable membrane impermeable liquid, bringing the thus-concentrated semipermeable membrane impermeable liquid under pressure into contact with an internal pressure type tubular semipermeable membrane having an inner diameter which is greater than that of the above capillary semipermeable membrane and which is 20 mm or less to separate it into a semipermeable membrane permeable liquid and a semipermeable membrane impermeable liquid, and removing the organic solvent from at least one of the total semipermeable membrane permeable liquid and the semipermeable membrane impermeable liquid to obtain a purified glyceride oil and/or a purified phospholipid.

2. The process as claimed in claim 1, wherein after the dilution of the crude glyceride oil composition containing the glyceride oil and phospholipid with the organic solvent, it is firstly concentrated to 2 to 10 times the original concentration by the use of the capillary type semipermeable membrane and then to 3 to 60 times the original concentration by the use of the tubular semipermeable membrane.

3. The process as claimed in claim 1 or 2, wherein the crude glyceride oil composition is diluted with the organic solvent to adjust the glyceride oil content to 10 to 80% by weight of the crude glyceride oil composition.

4. The process as claimed in claim 1, wherein the semipermeable membrane is made of a polyimide consisting essentially of a repeating unit represented by the general formula:

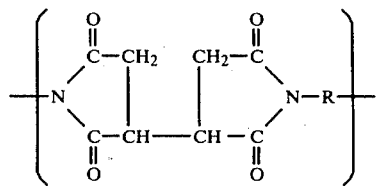

wherein R is a divalent organic group.

5. The process as claimed in claim 4, wherein R in the general formula is

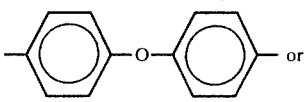 or

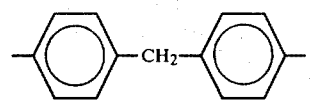

6. The process as claimed in claim 1, wherein the semipermeable membrane is made of an aromatic polyamide consisting essentially of a repeating unit represented by the general formula:

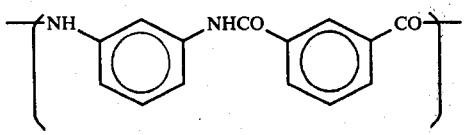

7. The process as claimed in any of claims 1 to 6, wherein the semipermeable membrane has a molecular weight cut-off of 10,000 to 100,000.

8. The process as claimed in claim 1, wherein the inner diameter of the internal pressure type tubular semipermeable membrane is about 5 to 160 times larger than that of the capillary semipermeable membrane.

9. The process as claimed in claim 1 wherein the inner diameter of the internal pressure capillary semipermeable membrane is from 0.15 to 1.8 mm and the inner diameter of the internal pressure tubular semipermeable membrane is from 2 to 20 mm.

10. The process as claimed in claim 9 wherein the linear rate of feeding the crude glyceride oil composition to the internal pressure capillary semipermeable membrane is 0.1–5 m/sec and the pressure is 0.2 to 5 kg/cm$^2$ and wherein the rate of feed of the concentrated semipermeable membrane impermeable liquid to the internal pressure type tubular semipermeable membrane is 0.5–10 m/sec and the pressure is 1–10 kg/cm$^2$.

11. The process as claimed in claim 10 wherein the solvent has a molecular weight of 50 to 200.

12. The process as claimed in claim 11 wherein the temperature is 5°–100° C.

* * * * *